(No Model.)

A. WILSON.
SASH CORD FASTENER.

No. 475,956. Patented May 31, 1892.

WITNESSES

INVENTOR
Alexander Wilson.
By Foster Freeman
Attorneys.

UNITED STATES PATENT OFFICE.

ALEXANDER WILSON, OF RISING SUN, MARYLAND, ASSIGNOR OF ONE-HALF TO JOB B. SIDDELL, OF SYLMAR, PENNSYLVANIA.

SASH-CORD FASTENER.

SPECIFICATION forming part of Letters Patent No. 475,956, dated May 31, 1892.

Application filed May 8, 1891. Serial No. 392,036. (No model.)

*To all whom it may concern:*

Be it known that I, ALEXANDER WILSON, a citizen of the United States, residing at Rising Sun, Cecil county, State of Maryland, have invented certain new and useful Improvements in Sash-Cord Fasteners, of which the following is a specification.

My invention relates to sash-cord fasteners, and has for its object to furnish a cheap, substantial, and convenient device for connecting the ends of the pulley-cords of sash balances or weights with the sash, whereby the latter may be readily and easily detached from said cord and may be again as easily and readily attached thereto; and it consists in a device constructed and arranged substantially as hereinafter more particularly set forth.

Figure 1:
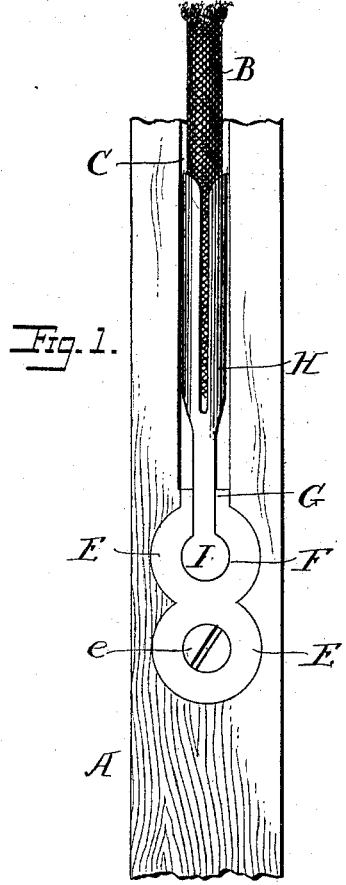
Figure 5:
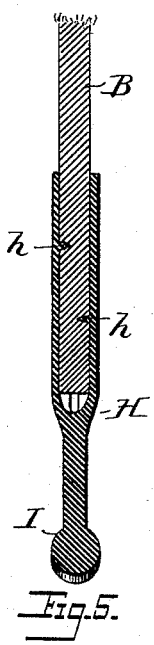
Figure 2:
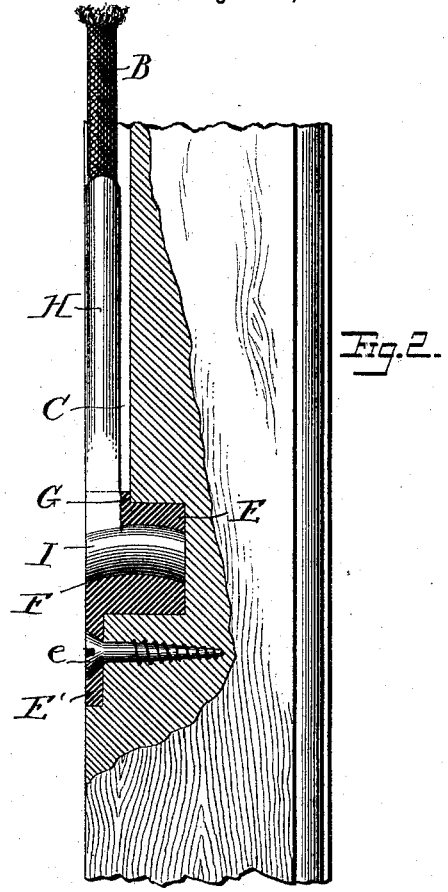
Figure 4:
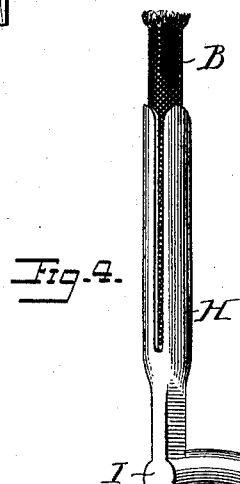
Figure 3:
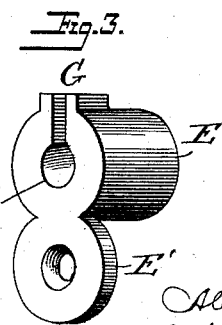

Referring to the accompanying drawings, Figure 1 is an edge view of the sash, showing the sash-cord holder in place. Fig. 2 is a side view of the same, partially in section. Fig. 3 is a perspective view of the socket. Fig. 4 is a similar view of the sash-cord holder, and Fig. 5 is a sectional view through the same.

While my invention is primarily adapted for sash-cord fasteners, of course it will be understood that it can be used for other purposes for which it is applicable; but I have shown and described it in connection with a window-frame, in which A represents one of the stiles or vertical bars of the window-sash and B one of the sash-cords usually connected to the counterpoise and passing over a pulley in the frame. The sash is provided with a central groove C, as is usual, and this groove terminates in a hole or recess D, which is usually bored therein. Into this recess is fitted a socket-piece E, which is shown as consisting of a cylindrical body having an opening F through its center, and this opening is curved on the arc of a circle, as clearly shown in Fig. 2. Extending from this opening to one side of the periphery of the socket is a slot G for the reception of the shank H of the holder I. The socket-piece should be provided with some means for securing it in the recess of the sash-holder, and while this may be accomplished by various means I have shown the socket provided with an extended lip E', which is adapted to fit in a shallow recess in the edge of the sash-frame and to be secured by a nail or screw e, and this furnishes a simple and ready means for securing the socket in the recess.

The sash-cord B is secured in the shank H in any suitable manner, and I have shown the spurs h projecting inwardly and adapted to be embedded in the body of the sash-cord, the shank being preferably bifurcated or made with two arms adapted to embrace the opposite side of the sash-cord.

The holder I consists of a segment of a ring having one end connected to the shank H, the free end being adapted to fit into the opening F in the socket E. This holder is made curved or segmental in order that it may be more readily inserted and removed and also fit more closely in the socket-piece, and when once in position it cannot be withdrawn without moving the shank outward and downward on a curve concentric with the curve or segmental opening in the socket-piece from the sash, which of course cannot be done when the window is in place. The shank is also adapted to fit in the recess G in the socket, and when the parts are in position they are securely and rigidly held and form a strong and safe support for the sash, while at the same time the parts may be separated and the sash removed when desired without the use of any tool or appliances, it simply being necessary to grasp the shank to which the cord is attached and draw it outward and downward on a curve concentric with the segmental holder from the sash, when the holder readily slips out of the opening in the socket.

From the above it will be seen that the sash-cord holder consists, practically, of two pieces, both of which can be formed of cast metal and require little or no tooling or finishing, and the whole constitutes a simple, cheap, and effective means for connecting the sash-cord with the window-frame.

What I claim is—

A sash-cord fastener consisting of a cylindrical socket having a curved opening passing through it and a holder consisting of a segment of a ring conforming to the curved opening in the socket and having a shank for attachment to the cord, substantially as described.

In testimony whereof I have signed my name to this specification in the presence of two subscribing witnesses.

ALEXANDER WILSON.

Witnesses:
CLARENCE T. DARE,
WILLIAM H. MYERS.